(12) United States Patent
Aaltonen

(10) Patent No.: US 7,986,687 B2
(45) Date of Patent: Jul. 26, 2011

(54) MULTICAST DATA TRANSFER

(75) Inventor: Janne Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 1162 days.

(21) Appl. No.: 10/529,257

(22) PCT Filed: Sep. 27, 2002

(86) PCT No.: PCT/IB02/04004
§ 371 (c)(1),
(2), (4) Date: Sep. 20, 2006

(87) PCT Pub. No.: WO2004/030399
PCT Pub. Date: Apr. 8, 2004

(65) Prior Publication Data
US 2007/0053358 A1    Mar. 8, 2007

(51) Int. Cl.
*H04L 12/28* (2006.01)
(52) U.S. Cl. .......... 370/389; 370/401
(58) Field of Classification Search .......... 370/390, 370/428, 429, 392
See application file for complete search history.

(56) References Cited

U.S. PATENT DOCUMENTS

| | | | |
|---|---|---|---|
| 5,561,637 A * | 10/1996 | Dan et al. | 365/230.03 |
| 6,088,721 A * | 7/2000 | Lin et al. | 709/214 |
| 6,633,765 B1 * | 10/2003 | Maggenti | 455/503 |
| 7,075,904 B1 * | 7/2006 | Manish et al. | 370/312 |
| 7,099,346 B1 * | 8/2006 | Kanterakis | 370/431 |
| 7,411,901 B1 * | 8/2008 | Alexander et al. | 370/230 |
| 2001/0015958 A1 * | 8/2001 | Iliadis | 370/238 |
| 2001/0034793 A1 | 10/2001 | Madruga et al. | |
| 2003/0043760 A1 * | 3/2003 | Taylor | 370/316 |
| 2003/0043844 A1 * | 3/2003 | Heller | 370/466 |

FOREIGN PATENT DOCUMENTS
EP   0951 198 A   10/1999
WO   WO 02 45317 A   6/2002

* cited by examiner

*Primary Examiner* — Chirag G Shah
*Assistant Examiner* — Daniel Mitchell
(74) *Attorney, Agent, or Firm* — Banner & Witcoff Ltd.

(57) ABSTRACT

An edge router (6) for multicast data transfer comprises a cache (10). In response to a request for a file from a host (3a), the router (6) retrieves the file from a content provider (2). The file, comprising data packets A-G, is stored in the cache (10) before transmission to host (3a) to allow the receipt of requests for the same file from other hosts (3b, 3c). A timer is activated to count down through a predetermined waiting period T. A file delivery group is defined, comprising host (3a). Any other hosts (3b, 3c) located in the same cell as host (3a), requesting the same file during period T are added to the group. When a predetermined number of requests have been received or, alternatively, when the waiting period T expires, the file is retrieved from the cache (10) and forwarded to the hosts (3a, 3b, 3c), in the group.

16 Claims, 3 Drawing Sheets

MULTICAST DATA TRANSFER

FIELD OF THE INVENTION

The invention relates to the simultaneous delivery of information to multiple hosts. In particular, the invention relates to an apparatus and method for transferring text, audio, video or other data to multiple hosts in a communication system.

BACKGROUND

Methods for transmitting data from a source to multiple users over a network fall into one of three categories. Unicast is a point-to-point delivery mechanism, where a source transmits a separate stream of data for each user. The volume of data transmitted increases linearly with the number of users, leading to the consumption of an unacceptably high level of resources where the number of recipients is large. The remaining two categories define point-to-multipoint or multipoint-to-multipoint delivery mechanisms. Broadcasting refers to the transmission of data to all hosts on a network. While this may work well in small networks, it requires the replication of a large number of data packets when used in a wide area network with many users. Furthermore, this method can be wasteful where the data is not of interest to a significant proportion of the recipients.

The third category is multicasting, which is the simultaneous transmission of data to a select group of users. Multicasting has particular application in fields requiring streaming of content to multiple users in real time, such as news feeds, online gaming, Digital Video Broadcasting (DVB) and videoconferencing. Overviews of this technique are given in "Multicast Networking and Application" by C. Kenneth Miller, Addison-Wesley 1988 [ISBN 0-201-30979-3] and in "Deploying IP MULTICAST in the Enterprise" by T. Maufer, Prentice Hall PTR, 1998 [ISBN 0-13-897687-2]. The use of multicasting in a cellular radio access network is discussed in "Multimedia Broadcast/Multicast Service", $3^{rd}$ Generation Partnership Project Technical Specification 3GPP™ TS 22.146 v1.0.0 2001.

FIG. 1 is a block diagram of a prior communication system 1, for multicasting information from a content provider, i.e., host 2, to a plurality of receiver hosts 3 via the Internet 4. For simplicity, the data path 5 is depicted as extending directly from the content provider 2 to a router 6 without intervening stages, such as other transmitters or routers, which may be located between these nodes. The data paths leading from the content provider 2 to the receiver hosts 3a-3c diverge at the router 6. Situations where this divergence include those where the receiver hosts 3 do not belong to the same sub-network, where the receiver hosts 3 are served by different transmitters 7 or where the radio access network is not multicast enabled.

Instead of sending a separate stream of data packets A-D for each individual receiver host 3a, 3b, the content provider 2 provides a single data stream 5. The data stream is replicated by a multicast-enabled edge router 6 wherever the paths to the different receiver hosts 3a, 3b diverge. The router 6 copies the incoming data packets A-E, producing duplicate data streams 8a, 8b for transmission to the receiver hosts 3a, 3b. As the content provider 2 transmits only a single data stream 5, the use of its system resources and the network load are reduced when compared with a unicast system. Furthermore, as the transmission of replicated data is kept to a minimum, multicasting may be used in wide area networks where broadcasting is unfeasible.

There are two types of multicasting services. In the first, a content provider has a reserved bandwidth for delivering a predetermined service to a group of end-users. The second type allows end-users to select the service provided to them. In both cases, a user can receive the multicast stream of data by submitting a request to join the group by sending a message to the content provider in a format specified by the Internet Engineering Task Force (IETF). The user can leave the multicast group by submitting a corresponding request.

Multicasting is a suitable mechanism for providing end-users with a continuous service and has limited applicability for "one-shot" transmissions. For example, a group of users may requite the delivery of a file, for example, a multimedia clip, a web page, an mp3 file, a document or a software module for an application or a game. Referring again to FIG. 1, the users of receiver hosts 3a, 3b may both request the file, which comprises data packets A-E, from the content provider 2. As the data stream 5 is received by the router 6, the data packets are copied and forwarded to a radio transmitter 7, which transmits the encapsulated data packets to receiver hosts 3a, 3b as data streams 8a, 8b over a wireless network.

There are currently no provisions for allowing a host to join an ongoing file delivery transmission, so a third host 3c, requesting a file after the start of the transmission, would be excluded. Even if the third host 3c were to join the file delivery transmission, data packets A-C would have been missed and it is probable that the user of host 3c would require the entire file. This exclusion increases the likelihood that a transmission is received by a low number of recipients, or even a single user. Any requests submitted after the delivery of the data packets A-E has commenced are accommodated by repeating the file delivery transmission, reducing the efficiency gain associated with the use of multicasting and increasing the use of the air interface bandwidth. As the use of the air interface in providing Internet type services rises, the efficient use of air interface bandwidth will become increasingly important.

Prior systems have addressed these problems by defining a schedule of forthcoming transmissions. A user can subscribe to a delivery list for a particular file, or set of files, and receive the relevant data at the next scheduled opportunity. However, this delivery mechanism does not respond directly to the user's requirements and is inflexible as, again, once the file delivery transmission has begun, any other further users requiring the same file are excluded and must subscribe to the next scheduled transmission.

SUMMARY OF THE INVENTION

An object of the invention is to allow multicast file delivery in a manner that is more responsive to users' needs, with particular application to scalable multicasts, such as unidirectional IP multicasts. The invention has particular advantages in systems comprising a wireless communications network by reducing use of the air interface bandwidth.

In a first aspect of the invention, a multicast-enabled network element comprises a first logical interface for receiving data from first host, a second logical interface for transmitting said data to one or more further hosts, a processor for defining a group comprising one or more further hosts, wherein a further host is added to the group in response to the reception of a request and a cache, wherein the network element is configured to store received data in the cache until a predetermined condition is met and, in response to the meeting of this condition, to forward the data to said further hosts in said group and the processor is configured to limit the group to further hosts situated at the same location.

In a second aspect of the invention, a method of file delivery over a network comprises the steps of receiving a request for the file from a first host at a network element, retrieving the file from a second host, storing the file in a cache associated with the network element, defining a group including the first host, waiting for a period of time until a predetermined condition is met where, if further requests for said file are received by the network element from one or more other hosts before the period of time expires, said one or more other hosts are added to the group, and forwarding the file to the first host and to any other hosts in said group, wherein the group is limited to the first host and other hosts situated at the same location as the first host.

In a third aspect of the invention, a multicast-enabled network element comprises a cache, said network element being configured to perform the following steps in response to a request for the delivery of a file from a first host: retrieve the requested file from a second host, store said file in said cache, define a group including the first host, delay forwarding the file to the first host for a period of time until a predetermined condition is met and, if further requests for said file are received by the network element from one or more other hosts before the period of time expires, add said one or more other hosts to the group and forward the file to the first host and to any other hosts in said group and is further configured to limit the group to the first host and to other hosts situated at the same location as the first host.

In a fourth aspect of the invention, a network element comprises first receiving means for receiving data from a first host, second receiving means for receiving a request from one or more further hosts, means for defining a group of further hosts, wherein a further host is added to the group in response to the reception of a request, forwarding means for forwarding said data to the further hosts and data storage means, wherein the network element is configured to store received data in the data storage means until a predetermined condition is met and, in response to the meeting of this condition, to retrieve said data and to forward the data to the further hosts in the group.

The implementation of the invention in a network element at the air interface, such as an edge router and the compilation of a group of file receiving hosts defined in terms of their location, and in particular the communications cell in which they are located, results in a reduction in use of the air interface bandwidth.

The use of a predetermined condition relating to the number of requests is intended to increase the likelihood that a given transmission will be received by more than one end user. The second condition assigns a maximum time period for the receipt of further requests. This places a maximum limit on the waiting time that may be experienced by a user, so that, for example, a single user is not subjected to an indefinite delay before receiving the requested file. The maximum time period may be fixed or may change dynamically in response to the requirements of the user and/or the network.

Where a host submits a file request during this time period, the time interval between the submission of the request and the receipt of the complete file is considerably reduced, increasing the data transmission rate perceived by such a user and thereby improving the quality of service.

BRIEF DESCRIPTION OF THE DRAWINGS

An embodiment of the invention will now be described with reference to the accompanying drawings, in which.

DETAILED DESCRIPTION

Figure 1:
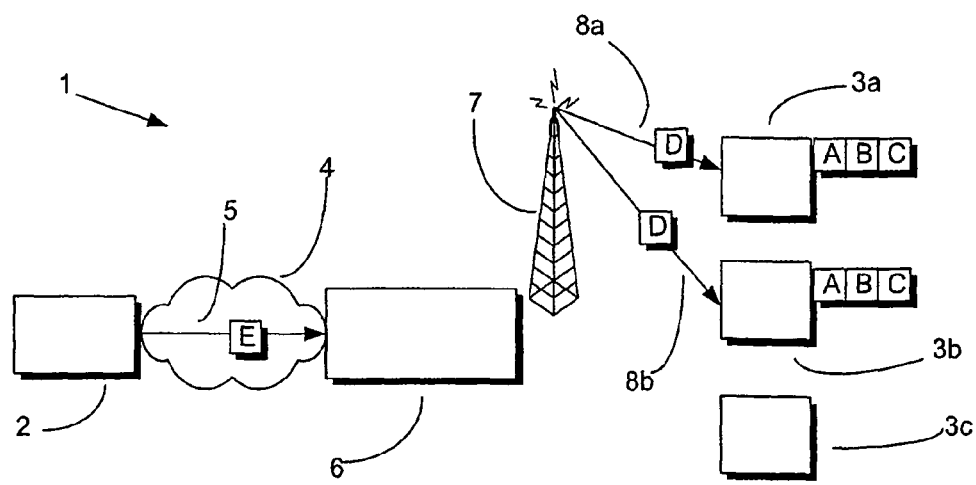
FIG. 1 is a block diagram of a prior art communication system.
Figure 2:
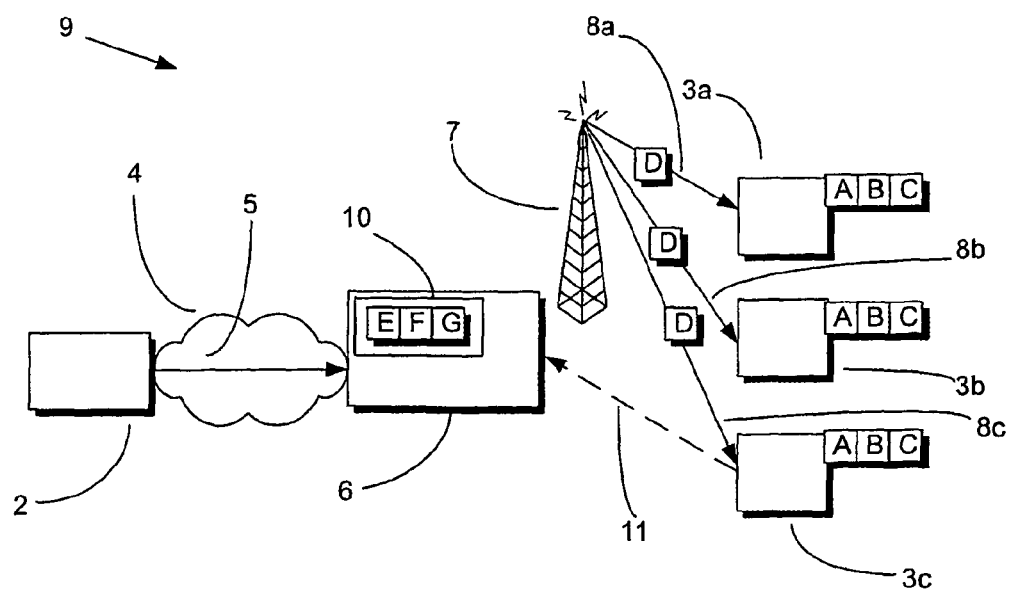
FIG. 2 is a block diagram of a communication system in accordance with an embodiment of the present invention.

FIG. 2 depicts an embodiment of a communication system 9 for multicast file delivery via the Internet 4 comprising a multimedia content provider 2, receiver hosts 3*a*-3*c*, a router 6, a radio transmitter 7 and a cache 10. The data path 5 may include further elements, such as other transmitters or routers, which may be located between the content provider 2 and router 6. The data paths leading from the content provider 2 to the receiver hosts 3*a*-3*c* have a common portion 5 extending between the content provider 2 and the router 6 and diverge between the router 6 and the individual receiver hosts 3*a*-3*c*.

In this particular example, receiver hosts 3*a*-3*c* are mobile devices belonging to a cellular wireless DVB-T wide area network (WAN) and the router 6 is an edge router, i.e. the last router before the air-interface in the file delivery path between the content provider 2 and the receiver hosts 3*a*-3*c*. The router 6 forwards the multicast data to the radio transmitter 7, which sends the data to the receiver hosts over the wireless network in accordance with a suitable communication protocol. Suitable protocols include, but are not limited to, the following protocols: Reliable Multicast Transport Protocol (RMTP), Reliable Multicast File Transfer Protocol (RMFTP), Asynchronous Layered Coding (ALC), NACK-Oriented Reliable Multicast (NORM), Pragmatic General Multicast (PGM), Tree Acknowledgement based protocol (TRACK), User Datagram Protocol (UDP) and Unidirectional Hypertext Transfer Protocol (UHTTP). The Session Announcement Protocol (SAP) may also be used for sending service information to the receiver hosts 3*a*-3*c*.

Figure 3:
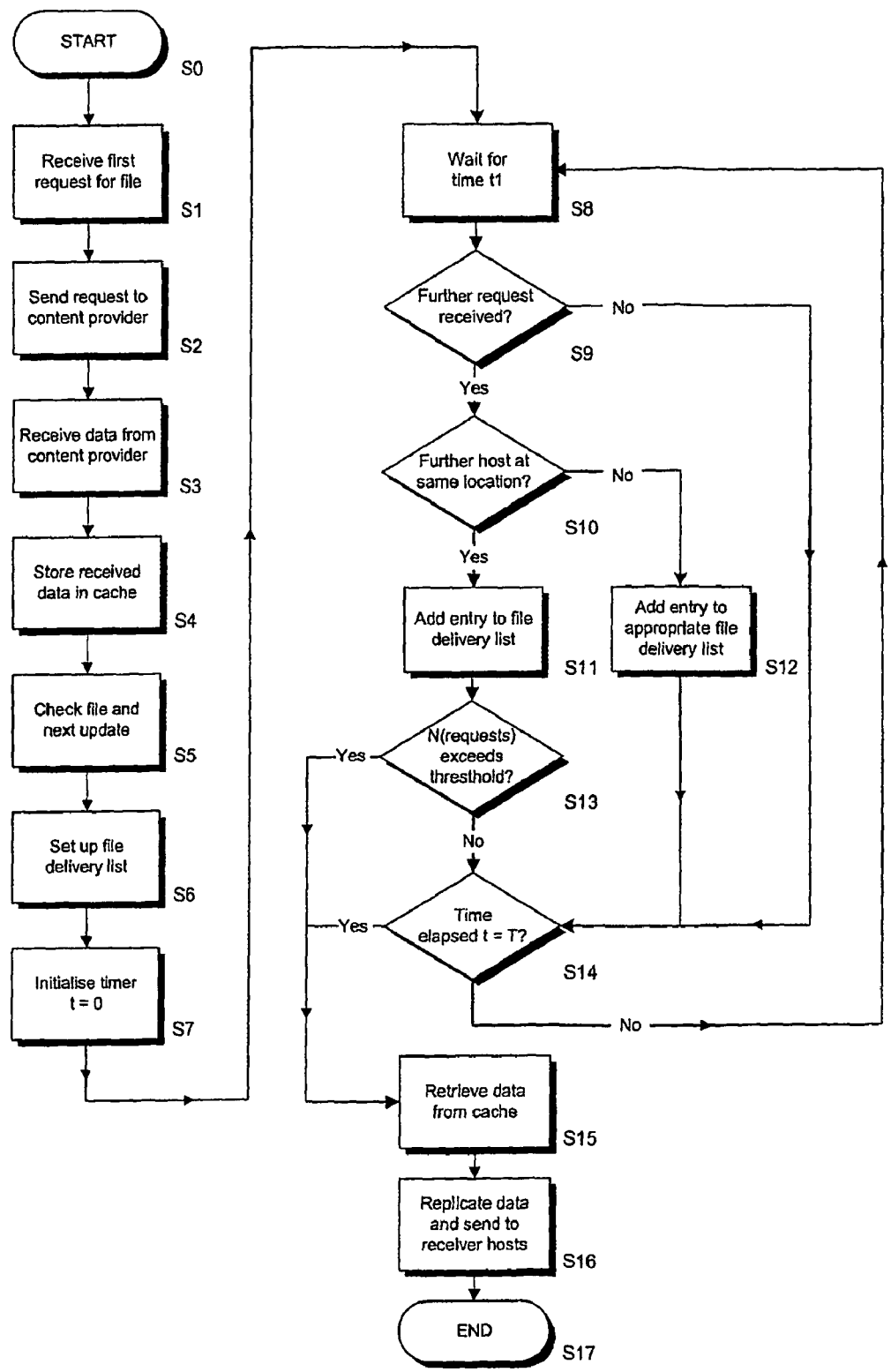
FIG. 3 is a flowchart of a method according to an embodiment of the present invention as enacted by a router.

An embodiment of the file delivery procedure followed by the router 6 is described with reference to FIG. 3. Beginning at step s0, the router 6 receives a request for a file from one of the receiver hosts, 3*a* (step s1), which is situated at a first location. The request includes the address information for the receiver host 3*a*, which is extracted by the router 6 for use in addressing data packets and messages directed to that receiver host 3*a*.

The file may be, for example, a multimedia clip of a goal in a football or hockey match. A number of end users, aware that a goal has been scored through other information sources, such as a radio broadcast, may submit a request for a clip within a short time interval following a goal.

In this example, where the multicast enabled network is unidirectional, communications between the receiver host 3*a* and the router 6 are made via another network or communication system 11, such as the Internet or a cellular telecommunications network. The router 6 requests the file from the content provider 2 (step s2), which responds by transmitting the file and an associated delivery message to the router 6. The delivery message includes information about the time the file was created and an indication of when it will next be updated.

In a conventional system, the router 6 would forward the data packets A-G to the receiver host 3*a* immediately and, once the transmission has commenced, it would not be possible for any further receiver hosts 3*b*, 3*c*, to join the multicast group and receive the data packets in that file delivery transmission.

To overcome this problem, the present router 6 receives the incoming data from the content provider 2 (step s3) and stores it in the cache 10 (step s4). The router 6 is configured to check that the file stored in the cache 10 is the latest version available (step s5) using the delivery message.

A file delivery list is defined comprising an entry corresponding to the first receiver host 3*a* (step s6) and a timer t is initialised (step s7). The delivery of the file is then delayed by a time period T. Notification that the delivery of the file is expected to commence after the expiry of time period T is sent to the first receiver host 3*a*. The time period T, which is divided into time intervals t1 (step s8), is allowed for the reception of any further requests for the same file from other receiver hosts, e.g., 3*b*, 3*c* at the same location as the first receiver host 3*a*, so that the receiver hosts 3*a*-3*c* can receive the file in the same file delivery transmission. The time period T can be fixed or may change dynamically, for example, so that a shorter period may be allowed as the number of received requests increases. Alternatively, the period T may depend on the time of the next update, as indicated in the delivery message, so that an updated file is transmitted to the receiver hosts 3, or on the size of the data file, so that a longer period is allowed for larger files in order to increase the likelihood of accommodating the requests of a number of end-users with a single file delivery transmission.

If a further request is received (step s9), the router 6 determines whether the receiver host 3*b* submitting the request is situated at the same location as the first receiver host 3*a* (step s10). The router 6 considers the receiver hosts 3*a*, 3*b* to be at the same location if they are within an area covered by the same cell, the cell being defined in either a bi-directional telecommunications network, where such a network is used for submitting requests to the router 6, or the wireless DVB-T network used for file delivery. Where the host has access to data about its location, such as its DVB-T cell, it will include this information in the request for the file for this purpose. If the receiver host 3*b* is at the same location, it is added to the file delivery list (step s11). If not, the router 6 then adds an entry to a separate file delivery list (step s12) corresponding to the location of receiver host 3*b*, setting up a new file delivery list if necessary. The receiver host 3*b* is then notified of the expected start time of the file delivery transmission, i.e. the end of time period T.

Any further requests submitted by receiver hosts 3*b*, 3*c* at the first location are handled by the router 6 and should not be directed to the content provider 2. However, the content provider 2 has the facility to check incoming requests as in case such a request is received. The content provider 2 compares incoming requests and, if a request from a host 3*b* matches a previous request from another host 3*a* in terms of the file requested and the location of the receiver host 3, information relating to the match is sent to the router 6, so that the host 3*b* that submitting the later request can be added to the file delivery list.

After a further request has been received, or after the expiry of time interval t1, the router 6 checks whether the number of requests entered in the file delivery list exceeds a predetermined threshold N (step s13). If this condition is not met and the period T has not yet elapsed (step s14), the router waits for a further interval t1 (step s8). This process is repeated until one of these conditions is satisfied, i.e., either the number of requests exceeds the threshold or the time period T has elapsed.

The router 6 then retrieves the data packets A-G from the cache 10 (step s15). Where more than one end-user has requested the file, the router 6 copies the data packets A-G, producing multiple data streams 8*a*-8*c* and transmits them to the receiver hosts 3*a*-3*c* (step s16). The file delivery procedure is then complete (step s17).

Figure 4:
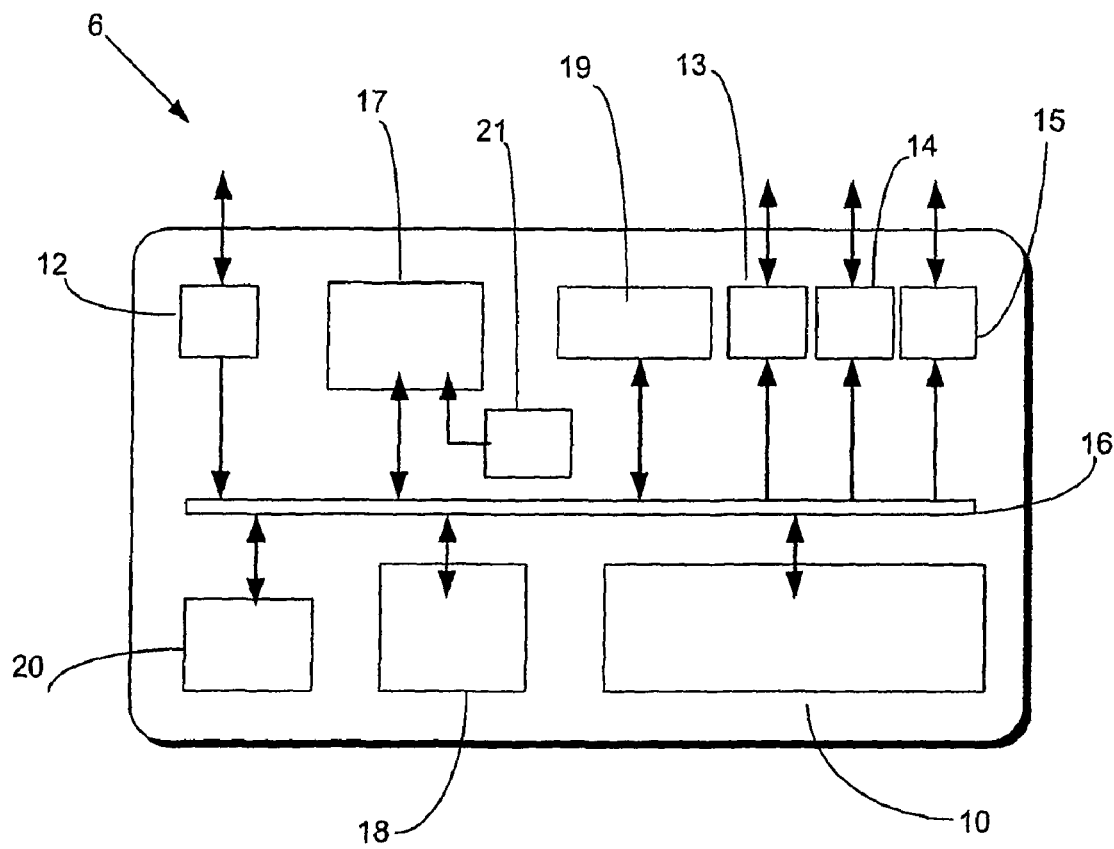
FIG. 4 is a block diagram of a router in accordance with an embodiment of the present invention.

An example of a suitable router 6 is shown in FIG. 4. In addition to the cache 10, the router 6 comprises an input/output interface 12 for receiving data from the content provider 2, input/output interfaces 13-15 for communicating with the receiver hosts 3*a*-3*c* and a number of other components connected by a data bus 16 as follows. A processor 17 monitors and controls routing operations, including generating processes for establishing and releasing connections between the router 6 and receiver hosts 3*a*-3*c*. A memory facility 18 is provided for storing the router application software. An address processor 19 extracts the address information from incoming data packets and uses this information to determine how each data packet is to be processed, e.g., whether an incoming packet is a request for a file from a receiver host 3*a*-3*c* or file data. Incoming file data is stored in the cache 10, although the router 6 may also use an external buffer for this purpose. Requests are forwarded to a file request handler 20, which stores the address of the receiver host 3 making the request in a file delivery list and manages the copying of data packets A-G for transmission to the receiver hosts 3*a*-3*c*. The file request handler 20 also controls any queuing processes, e.g. where a further request has been received after the file transmission has commenced. A clock 21 is associated with the processor 17 for controlling the timer functions described above.

Figure 5:
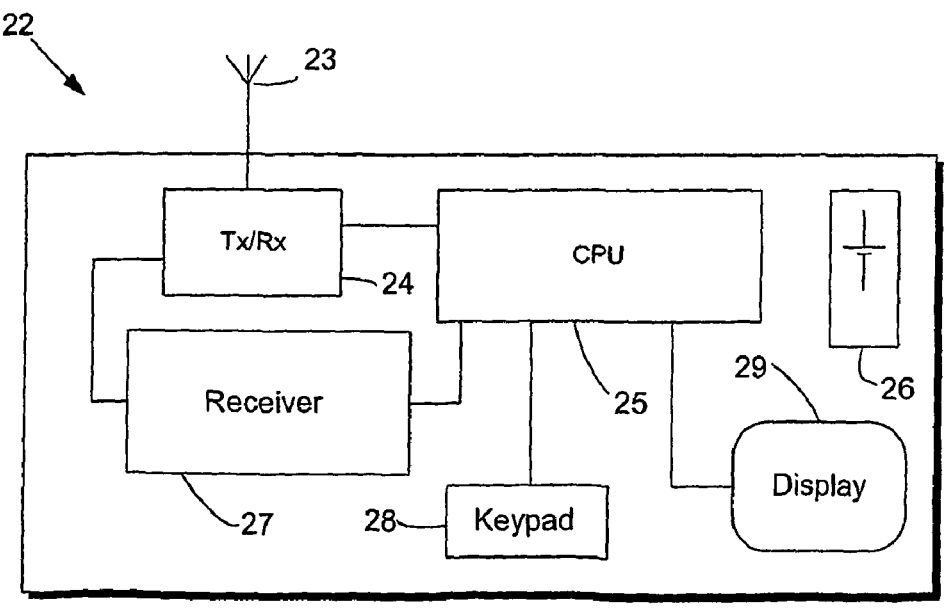
FIG. 5 depicts a mobile handset terminal for use according to an embodiment of the invention.

The receiver hosts 3 may be mobile telephone handset terminals 22, as shown in FIG. 5. The mobile telephone handset terminal comprises an antenna 23, a transceiver 24, a central processing unit (CPU) 25 and a battery 26. The transceiver 24, which is, for example, a GSM, GPRS, 3G, or similar bi-directional transceiver, is connected to the antenna 23 and the CPU 25. Also connected to the CPU 25 are a receiver (DVB-T) 27, a keypad 28 and a display 29. The terminal 22 also includes other conventional features of mobile telephone handsets, but these are omitted from FIG. 5 for the sake of clarity.

Where three receiver hosts 3*a*-3*c* receive the same file in a single multicast, the increase in efficiency over a unicast system, or the prior multicast system where the likelihood of a transmission being received by a single receiver host 3 is significantly increased, is three-fold, i.e., the data packets A-G are sent through the network 4 once, instead of three times. However, as the transmission to the first receiver host 3*a* has been delayed by time T, or by the time taken to receive N requests, the user of host 3*a* will perceive an associated decrease in bandwidth, but this may be offset by "pooling" of the bandwidth available to the three receiver hosts 3*a*-3*c*

The performance of the present system is compared with a prior art system in the following example.

In the prior art system, the file is delivered to the first host 3*a* immediately and, as the subsequent requests from hosts 3*b*, 3*c* cannot be met from the ongoing transmission, the other hosts 3*b*, 3*c* receive the data in a subsequent file delivery transmissions. For example, downloading a file of 10 Mbits over a network with an available bandwidth of 1 Mbit/s would take 10 s. A file delivery transmission sending data to receiver host 3*a* begins at 0 s. Requests from the users of hosts 3*b* and 3*c* are submitted after the file delivery transmission to host 3*a* has commenced, at 4 s and 12 s respectively. The resulting waiting times and perceived bandwidths in the prior system would be 10 s and 1 Mbit/s for host 3*a*, 14 s and 700 kbit/s for host 3*b*. The request from host 3*c* would be received after the second file delivery transmission, to host 3*b*, has started, and so would be queued until a third file delivery transmission could begin. Host 3*c* would therefore experience a waiting time of 18 s and perceive a bandwidth of 550 kbit/s. Therefore, under the prior system, the three hosts 3a-3c would perceive an average bandwidth of 750 kbit/s, If the method of the present invention is followed, these time periods and bandwidths are 25 s and 400 kbit/s for host 3a, 21 s and 480 kbit/s for host 3b and 13 s and 770 kbit/s for host 3c. This provides an average perceived bandwidth of 550 kbit/s, although this does not reflect the efficiency gains arising from a reduced network load and reduced duplication of transmissions.

The perceived average bandwidth in the system of the present invention further increases with respect to the prior system as more hosts are added to the multicast group. This is demonstrated in Table 1, where $t_d$ indicates the time taken to complete the delivery of the file from the time that User 1 submits their request. PBW denotes the bandwidth perceived by the user.

TABLE 1

| | | | Prior System | | | Present system | | |
|---|---|---|---|---|---|---|---|---|
| User | Time of Request (s) | File Size (Mbit) | Transfer Rate (Mbit/s) | $t_d$ (s) | PBW (kbit/s) | Waiting period T (s) | $t_d$ (s) | PBW (kbit/s) |
| 1 | 0 | 10 | 1 | 10 | 1000 | 15 | 25 | 400 |
| 2 | 4 | 10 | 1 | 20 | 625 | 15 | 21 | 476 |
| 3 | 12 | 10 | 1 | 30 | 556 | 15 | 13 | 769 |
| 4 | 12 | 10 | 1 | 40 | 357 | 15 | 13 | 769 |
| 5 | 12 | 10 | 1 | 50 | 263 | 15 | 13 | 769 |
| 6 | 13 | 10 | 1 | 60 | 213 | 15 | 12 | 833 |
| 7 | 13 | 10 | 1 | 70 | 175 | 15 | 12 | 833 |
| 8 | 14 | 10 | 1 | 80 | 133 | 15 | 11 | 909 |
| 9 | 15 | 10 | 1 | 90 | 386 | 15 | 10 | 1000 |

The invention has been described by way of an example and can be used for transferring data packets other than IP packets. While a point-to-multipoint transmission has been described, the invention may also be used for multipoint-to-multipoint data transfer. The receiver hosts 3a-3c may be fixed or mobile devices, e.g., mobile telephones or personal digital assistants (PDAs). It is not necessary for the receiver hosts 3a-3c to belong to the same local network or for the location of the hosts to be defined in terms of cell coverage.

Furthermore, it is not necessary for the router 6 may transmit data to the receiver hosts 3a-3c using a wireless communication system. The embodiment described relates to a system comprising a WAN, however, the invention is equally applicable to LAN networks or any other multicast enabled network and may be used for the transfer of files over networks other than the Internet or a DVB-T network, e.g., over DVB-S (satellite), DVB-C (cable), other DVB variants, Integrated Services Digital Broadcasting (ISDB), ATSC Digital Television or Digital Audio Broadcasting (DAB) networks or in multicast-enabled General Packet Radio Service (GPRS), Enhanced Data GSM Environment (EDGE), Universal Mobile Telecommunications Systems (UMTS) or Wireless Code Division Multiple Access (W-CDMA) or CDMA2000 systems.

Furthermore, although the described embodiment comprised an edge router 6, the invention may be implemented at any network element, e.g., a server, node or router, along the path between a content provider 2 and receiver hosts 3a-3c.

The invention claimed is:
1. An apparatus comprising:
a processor; and
a memory storing program instructions, the memory and the program instructions configured to, with the processor, cause the apparatus at least to perform:
a) process data received from a first host;
b) cause transmission of said data to one or more further hosts;
c) define a group comprising one or more further hosts, wherein a further host is added to the group in response to reception of a request;
d) determine whether a first condition is met, the first condition being that a number of received requests for a file exceeds a predetermined threshold;
e) determine whether a second condition is met, the second condition being that a time limit has expired;
f) repeat d) and e) until either of the first and second conditions is met, and then to forward the data to said further hosts in said group, and wherein the processor is configured to limit the group to further hosts situated at a same location.

2. An apparatus according to claim 1, wherein one or both of the request and the file is transmitted between the apparatus and the first host via a cellular communications network and a location of the further host is defined in terms of a cell, so that the group is limited to further hosts situated in an area covered by a single cell.

3. An apparatus according to claim 1, wherein the memory and the program instructions are further configured to, with the processor, cause the apparatus to forward the file over a wireless communication network, being a last apparatus located before an air-interface in a file delivery path between the first host and the one or more further hosts.

4. An apparatus according to claim 1, wherein said apparatus comprises a router.

5. An apparatus according to claim 1, wherein the memory and the program instructions are further configured to, with the processor, cause the apparatus to receive requests from the further hosts via a first communication path and to forward data to the further hosts via a second communication path, separate from the first communication path.

6. An apparatus according to claim 5, wherein the first communication path and the second communication path comprise separate networks.

7. A method comprising:
a) receiving a request for a file from a first host at a network element;
b) retrieving the file from a second host;
c) storing the file in a cache associated with the network element;
d) defining, by the network element, a group including the first host;
e) in response to receiving further requests for said file by the network element from one or more other hosts before a period of time expires, adding said one or more other hosts to the group;
f) determining whether a first condition is met, the first condition being that a number of received requests for the file exceeds a predetermined threshold;
g) determining whether a second condition is met, the second condition being that a time limit has expired;
h) repeating and g) until either of the first and second conditions is met, and then forwarding the file to the first host and to any other hosts in said group, wherein the group is limited to the first host and other hosts situated at a same location as the first host.

8. A method according to claim 7, wherein one or both of the request and the file is transmitted between the network element and the first host via a cellular communications network and another host is considered to be at the same location as the first host if situated in an area covered by a same cell.

9. A method according to claim 7, wherein the file is forwarded over a wireless communication network, the network element being a last network element before an air-interface in a file delivery path between the second host and the first host.

10. A method according to claim 7, wherein the network element comprises a router.

11. A method according to claim 7, wherein the request is received via a first communications network and the file is forwarded via a second communications network.

12. A memory storing computer-executable instructions that, when executed, cause an apparatus at least to perform:
  a) receiving a request for a file from a first host at the apparatus;
  b) retrieving the file from a second host;
  c) storing the file in a cache associated with the apparatus;
  d) defining a group including the first host;
  e) in response to receiving further requests for said file by the apparatus from one or more other hosts, adding said one or more other hosts to the group;
  f) determining whether a first condition is met, the first condition being that a number of received requests for a file exceeds a predetermined threshold;
  g) determining whether a second condition is met, the second condition being that a time limit has expired;
  h) repeating f) and g) until either of the first and second conditions is met, and then forwarding the file to the first host and to any other hosts in said group, wherein the group is limited to the first host and other hosts situated at a same location as the first host.

13. The memory according to claim 12, wherein one or both of the request and the file is transmitted between the apparatus and the first host via a cellular communications network and another host is considered to be at the same location as the first host if situated in an area covered by a same cell.

14. The memory according to claim 12, wherein the file is forwarded over a wireless communication network, the apparatus being a last apparatus before an air-interface in a file delivery path between the second host and the first host.

15. The memory according to claim 12, wherein the apparatus comprises a router.

16. The memory according to claim 12, wherein the request is received via a first communications network and the file is forwarded via a second communications network.

* * * * *

UNITED STATES PATENT AND TRADEMARK OFFICE
CERTIFICATE OF CORRECTION

PATENT NO. : 7,986,687 B2  
APPLICATION NO. : 10/529257  
DATED : July 26, 2011  
INVENTOR(S) : Janne Aaltonen It is certified that error appears in the above-identified patent and that said Letters Patent is hereby corrected as shown below:

In Column 8, Claim 7, Line 60:
Please replace "repeating and g)" with --repeating f) and g)--

Signed and Sealed this  
Thirteenth Day of March, 2012

David J. Kappos  
*Director of the United States Patent and Trademark Office*